Patented Nov. 6, 1934

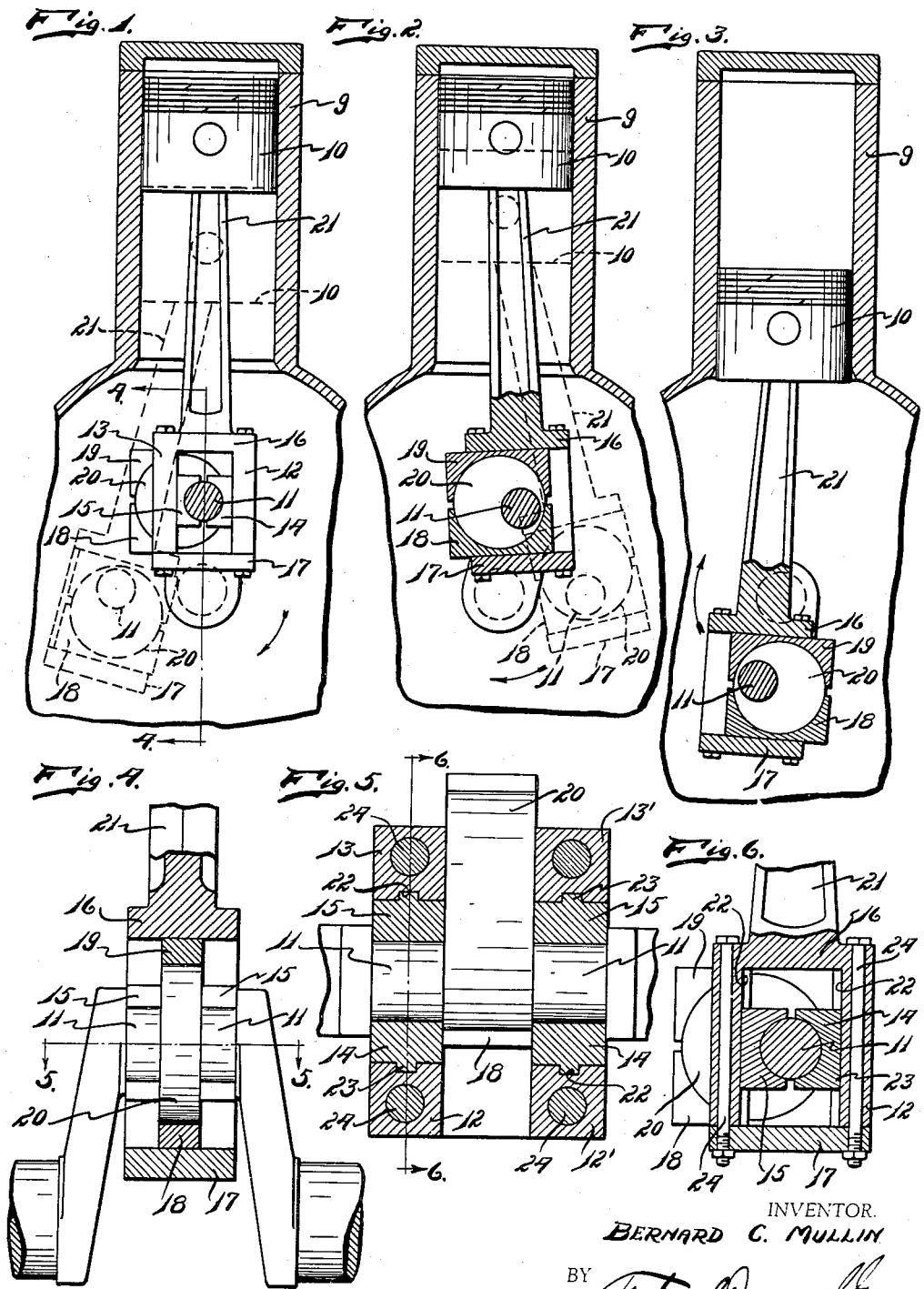

1,979,987

UNITED STATES PATENT OFFICE 1,979,987

CRANK AND CONNECTING ROD CONNECTION

Bernard C. Mullin, Detroit, Mich.

Application August 10, 1932, Serial No. 628,166

2 Claims. (Cl. 74—36)

My invention relates to a new and useful improvement in crank and connecting rod connections and adapted for use with that type of engine in which a reciprocating piston is connected to a crank shaft for the purpose of rotating the same. The invention is particularly adapted for use with internal combustion engines in which an exploding gas is used for power purposes. It is an object of the present invention to provide a connection between the crank and the connecting rod so that the travel of the piston during the first 90° of rotation of the crank shaft will be retarded.

It is another object of the present invention to provide a construction of this kind in which the piston will not move downwardly until the crank shaft has passed its center a substantial distance, and preferably a distance of about 30°.

It is another object of the present invention to provide a construction in which a connection between the crank shaft and the piston may be established so that the crank shaft will be well past center always when the power stroke of the piston begins.

Another object of the invention is the provision of a connection of this kind in which the efficiency of the engine may be increased and considerable gain in power effected over the conventional type of connections.

Another object of the invention is the provision of a connection in which a higher degree of expansion of the exploding gases may be retained due to the retarding of the piston in its initial movement.

Another object of the invention is the provision of a connection in which vibration is eliminated and a quiet smooth operating engine is produced.

Another object of the invention is the provision of a connection of this kind in which the crank is moved past center a substantial distance without losing any of the compression effected through the upward travel of the piston.

Another object of the invention is the provision of a connection of this kind which will be simple in structure, economical of manufacture, durable, easily and quickly assembled, and highly efficient in use.

Other objects will appear hereinafter.

The invention consists in the combination and arrangement of parts hereinafter described and claimed.

The invention will be best understood by a reference to the accompanying drawing which forms a part of this specification and in which, Fig. 1 is a central vertical sectional view of a piston and cylinder showing the invention applied.

Fig. 2 is a view similar to Fig. 1 showing the crank shaft moved beyond center with parts broken away and parts shown in section.

Fig. 3 is a view similar to Fig. 2 showing the crank shaft moved past center and the piston at its lowermost position.

Fig. 4 is a fragmentary sectional view taken on line 4—4 of Fig. 1.

Fig. 5 is a fragmentary sectional view taken on line 5—5 of Fig. 4.

Fig. 6 is a fragmentary sectional view reduced in size taken on line 6—6 of Fig. 5.

In the drawing I have illustrated the invention used with an engine embodying a piston 9 in which is slidably mounted a cylinder 10 which is connected to a connecting rod 21 in the conventional manner. The connecting rod carries at its lower end a head which constitutes a frame having side rails 12 and 12′ in alignment with each other and spaced apart and positioned oppositely of the side rails 13 and 13′ which are in alignment with each other and spaced apart. A cross head 16 is connected to the bottom plate 17 by the bolts 24. Slidably positioned between the rails 12′ and 13′ are the slide blocks 14 and 15 which embrace and serve as a bearing for the crank 11 of the crank shaft which is to be rotated. Slidably positioned between the cross head and the plate 17 are the slide blocks 18 and 19 which embrace and serve as bearings for the circular cam 20 which is eccentrically mounted on the crank 11 and which is adapted to project between the side rails 13 and 13′ and 12 and 12′. As shown in Fig. 5 these rails 12 and 12′ and 13 and 13′ are each provided on their inner faces with a groove 22 in which engages the tongue 23 projecting outwardly from the slide blocks 14 and 15.

In the drawing the rotation of the crank is in the direction indicated by the arrows. In Fig. 1 I have illustrated the position of the piston 10 and the eccentric cam 20 when the crank 11 is on upper dead center. It will be noted that the power transmitted from the piston 10 when the explosion is effected is delivered through the connecting rod 21 to the frame forming head carried by this connecting rod from this head the power is submitted through the slide blocks 18 and 19 to the cam 20 and from the cam 20 to the crank 11. As the crank 11 moves off its dead center to the right from the position shown in Fig. 1 the piston 10 will move slightly upwardly and then remain stationary until the crank 11 has passed center a substantial distance. This distance will depend upon the particular relative position of the crank and the cam 20 as well as the size of the cam. In the proportionate size illustrated in the drawing this movement will result in a displacement of the crank from the dead center the preferred distances, namely 30°. Consequently, as the crank moves from top dead center to a position of 30° the piston remains stationary and the compression which has been obtained is retained thus it is possible for the crank to move considerably off dead center without losing the compression. It is preferred in the operation of the engine that the explosion take place when the crank 11 has moved to the position, that is the position at which further movement of the same would effect a downward movement of the piston 10. As stated this position is preferably a displacement of 30°. When the explosion takes place the power will be transmitted to the crank at that angle which will assure a maximum torque power because of the displacement of the crank from its top dead center.

In Fig. 2 I have shown in dotted lines the position of the crank and the position of the piston when the crank has moved 90° past its position of top dead center. The movement of the piston is slight so that there is a retarding of the movement of the piston during the first 90°.

In Fig. 3 I have illustrated the position of the piston before it begins its upward movement. This position is substantially the position at which it arrives when the crank is at its bottom dead center so that the movement of the piston is a rapid movement while the crank is rotating through the second 90°, that is, from a position of 90° to a position of 180°. As the crank passes its bottom dead center the piston again remains stationary until the crank has passed its bottom dead center a substanial distance preferably, as stated, 30°. The reverse movement of the piston upwardly is exactly the same as the movement downwardly while the crank is travelling from a position of 30° past its bottom dead center to a position of 270° the movement of the piston will be slow and the movement of the piston during the remaining 90° of rotation of the crank will be a rapid movement. This slow upward movement of the piston while the crank is going through the third 90° permits of effective scavenging of the exploding gases and when compressing the compression is effected slowly during 90° of rotation and rapidly during the last quarter revolution of the crank.

The relation of the cam 20 to the crank shaft 11 is such that the cam is in its position of highest throw when the crank has moved 90° from its top dead center. Because of this relation the piston will move upward slightly after the crank has passed its top dead center and then remain stationary until the crank reaches a position of 30°. The same is true on the upward movement when the piston is at its lower position as the crank reaches its lower dead center and passes beyond the same the piston will move downwardly slightly while the crank is rotating through a few degrees of revolution and then remain staionary until the crank has reached the position of 30° past its bottom dead center. The advantages of such a construction are believed obvious in that the power is not transmitted to the crank until the crank is in a position to receive the power in an efficient manner as it is always considerably past dead center. The retarding of the piston permits a maximum transmission of power to the crank and thus the efficiency of the engine is considerably increased. The retarding of the piston at its top position of movement also permits a more complete combustion of the gases as there is provided a greater length of time for combustion while the gases are still under compression.

While I have illustrated and described the preferred form of my invention, I do not wish to limit myself to the precise details of structure shown but desire to avail myself of such variations and modifications of the invention as may come within the scope of the appended claims.

Having thus described my invention, what I claim as new and desire to secure by Letters Patent is:

1. In combination, a rotatable crank shaft having a crank formed thereon; a slidably mounted piston; a connecting rod connected at one end pivotally to said piston; a head carried on the opposite end of said rod; a cam carried by said crank; and slide blocks mounted in said head and embracing said cam and engageable therewith.

2. In combination, a rotatable crank shaft having a crank formed thereon; a slidably mounted piston; a connecting rod connected at one end pivotally to said piston; a head carried on the opposite end of said rod; a cam carried by said crank; slide blocks mounted in said head and embracing said cam and engageable therewith; and slide blocks carried by said head and engaging directly said crank, said first-mentioned slide blocks being movable transversely of said rod and said second-mentioned slide blocks being movable longitudinally of said rod.

BERNARD C. MULLIN.